(12) United States Patent
Florack et al.

(10) Patent No.: US 12,260,289 B2
(45) Date of Patent: Mar. 25, 2025

(54) AEROSOL-GENERATING ARTICLE COMPRISING THREE DIMENSIONAL CODE

(71) Applicant: PHILIP MORRIS PRODUCTS S.A., Neuchatel (CH)

(72) Inventors: Dionisius Florack, Le Landeron (CH); Evan Jochnowitz, Basel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/382,653

(22) Filed: Oct. 23, 2023

(65) Prior Publication Data
US 2024/0046054 A1 Feb. 8, 2024

Related U.S. Application Data

(63) Continuation of application No. 17/617,055, filed as application No. PCT/EP2020/066050 on Jun. 10, 2020, now Pat. No. 11,797,797.

(51) Int. Cl.
| | |
|---|---|
| *G06K 7/14* | (2006.01) |
| *A24F 40/20* | (2020.01) |
| *A24F 40/46* | (2020.01) |
| *A24F 40/53* | (2020.01) |
| *G06K 19/06* | (2006.01) |

(52) U.S. Cl.
CPC ............ *G06K 7/1408* (2013.01); *A24F 40/20* (2020.01); *A24F 40/46* (2020.01); *A24F 40/53* (2020.01); *G06K 19/06037* (2013.01)

(58) Field of Classification Search
CPC ........ A01N 25/00; A01N 25/12; A01N 63/30; A01P 21/00; A01P 5/00; C12N 1/145; C12R 2001/645; A24F 40/20; A24F 40/42; A24F 40/46; A24F 40/53; G06K 19/06037; G06K 7/1408
See application file for complete search history.

(56) References Cited

U.S. PATENT DOCUMENTS

| | | | | |
|---|---|---|---|---|
| 5,393,967 A | * | 2/1995 | Rice ................... | G06K 7/10594 235/440 |
| 5,677,522 A | * | 10/1997 | Rice ................... | G06K 7/10594 382/292 |
| 6,912,892 B2 | | 7/2005 | Lindig | |

(Continued)

FOREIGN PATENT DOCUMENTS

| | | |
|---|---|---|
| CN | 103324972 | 9/2013 |
| CN | 107836756 | 3/2018 |

(Continued)

OTHER PUBLICATIONS

Office Action issued in China for Application No. 202080037219.2 dated Dec. 17, 2023 (9 pages). English translation included.

(Continued)

*Primary Examiner* — Thien M Le
(74) *Attorney, Agent, or Firm* — Mueting Raasch Group

(57) ABSTRACT

The aerosol-generating article for use with an aerosol-generating device, the aerosol-generating article comprises an aerosol-forming substrate, and a surface area comprising a three dimensional code. The invention also relates to an aerosol-generating system comprising an aerosol-generating device and an aerosol-generating article.

12 Claims, 7 Drawing Sheets

(56) References Cited

U.S. PATENT DOCUMENTS

| | | | |
|---|---|---|---|
| 9,078,473 B2* | 7/2015 | Worm | A24F 40/46 |
| 2003/0200798 A1 | 10/2003 | Lindig | |
| 2006/0196945 A1 | 9/2006 | Mendels | |
| 2007/0096044 A1* | 5/2007 | Johannesson | G01B 11/25 |
| | | | 250/559.4 |
| 2009/0137950 A1 | 5/2009 | Loenner | |
| 2010/0055423 A1* | 3/2010 | Chretien | C09D 11/101 |
| | | | 428/209 |
| 2010/0115674 A1 | 5/2010 | Fujimoto | |
| 2012/0187187 A1* | 7/2012 | Duff | G06Q 10/00 |
| | | | 235/382 |
| 2012/0234905 A1* | 9/2012 | Lau | G06K 5/00 |
| | | | 235/375 |
| 2013/0345641 A1* | 12/2013 | Cerman | A61M 5/24 |
| | | | 604/189 |
| 2015/0189695 A1 | 7/2015 | Zhiyong | |
| 2016/0029697 A1 | 2/2016 | Shafer | |
| 2017/0360088 A1 | 12/2017 | Pijnenburg | |
| 2018/0093054 A1 | 4/2018 | Bowen | |
| 2018/0279689 A1 | 10/2018 | Qui | |
| 2019/0000144 A1 | 1/2019 | Bless | |
| 2019/0095928 A1* | 3/2019 | Lane | G06K 19/10 |
| 2019/0320717 A1 | 10/2019 | Tabasso | |
| 2020/0221782 A1 | 7/2020 | Lim | |
| 2020/0315261 A1 | 10/2020 | Hubbard | |
| 2020/0342507 A1 | 10/2020 | Hubbard | |
| 2020/0359703 A1* | 11/2020 | Daugherty | G06F 21/44 |
| 2022/0079242 A1 | 3/2022 | Daugherty | |
| 2023/0024704 A1 | 1/2023 | Lukan | |
| 2023/0042197 A1 | 2/2023 | Bruna | |

FOREIGN PATENT DOCUMENTS

| | | |
|---|---|---|
| CN | 208850675 | 5/2019 |
| JP | 5731061 | 6/2015 |
| JP | 2003-344257 | 12/2023 |
| RU | 2666100 | 9/2018 |

OTHER PUBLICATIONS

PCT International Search Report and Written Opinion for PCT/EP2020/066050 issued Sep. 4, 2020 (11 pages).

Office Action issued in Russia for Application No. 2921136418 dated Jun. 7, 2022 (8 pages). English translation included.

Office Action issued in Korea for Application No. 10-2021-7038141 dated Mar. 29, 2024 (8 pages). English translation included.

* cited by examiner

AEROSOL-GENERATING ARTICLE COMPRISING THREE DIMENSIONAL CODE

This application is a continuation of U.S. patent application Ser. No. 17/617,055, filed Dec. 7, 2021, which is a U.S. National Stage Application of International Application No. PCT/EP2020/066050 filed Jun. 10, 2020, which was published in English on Dec. 17, 2020, as International Publication No. WO 2020/249600 A1. International Application No. PCT/EP2020/066050 claims priority to European Application No. 19179580.6 filed Jun. 12, 2019.

The present invention relates to an aerosol-generating article comprising a three dimensional code, for use in an electrically operated aerosol-generating device as part of an electrically operated aerosol-generating system.

Electrically heated aerosol-generating systems typically include a power supply, such as a battery, connected to a heater to heat an aerosol-forming substrate and to form an inhalable aerosol. In use, such electrically heated aerosol-generating systems typically provide electric energy to the heater to provide a temperature range for releasing one or more volatile compounds from the aerosol-forming substrate. Electrically heated aerosol-generating systems may be reusable and may be arranged to receive an aerosol-generating article containing the aerosol-forming substrate. The aerosol-generating article may be disposable.

Aerosol-generating articles for electrically heated aerosol-generating systems are typically specially designed. The flavours are generated and released by a controlled heating of the aerosol-forming substrate. The operating conditions of an aerosol-generating article designed for an electrically heated aerosol-generating system may vary depending on the type, the amount, the flavour or other properties of the aerosol-generating article. Applying inappropriate operating conditions for an aerosol-generating article in an electrically heated aerosol-generating system may result in a poor user experience. Inappropriate operating conditions may also cause overheating which in turn may affect the integrity of the aerosol-generating system.

In addition, disposable aerosol-generating articles may be prone to counterfeiting. Since such fake products usually have a lower quality standard, their use may represent a potential risk to consumers. A three dimensional code may assist in this regard to prevent usage of the aerosol-generating system with disposable aerosol-generating articles from unauthorized sources.

It is known in the prior art to provide two dimensional codes in aerosol-generating articles. Such codes may be formed by identifiable ink on the surface of the aerosol-generating article, which code is then detected by the aerosol-generating device. For example, a bar code may be printed on the aerosol-generating article or on a packaging associated with the aerosol-generating article. Such two dimensional codes are easily damaged during normal handling of aerosol-generating articles. In addition these two dimensional codes can usually be read with conventional optical techniques and are easily replicated and are therefore prone to counterfeiting.

It is an object of the present invention to provide an improved aerosol-generating system which offers improved detection of aerosol-generating articles. It is an object of the present invention to provide an improved aerosol-generating system which offers improved authentication of aerosol-generating articles. It is an object of the present invention to provide an improved aerosol-generating system having increased difficulty to produce counterfeit articles. It is an object of the present invention to provide one or more pieces of information about an aerosol-generating article to an aerosol-generating device in an improved manner.

According to an embodiment of the invention there is provided an aerosol-generating article for use with an aerosol-generating device. The aerosol-generating article may comprise an aerosol-forming substrate. The aerosol-generating article may have a surface area. The aerosol-generating article may comprise a three dimensional code. At least a portion of the surface area of the aerosol-generating article comprises the three dimensional code.

According to an embodiment of the invention there is provided an aerosol-generating article for use with an aerosol-generating device. The aerosol-generating article comprises an aerosol-forming substrate. The aerosol-generating article has a surface area. At least a portion of the surface area of the aerosol-generating article comprises a three dimensional code.

The three dimensional code may be provided to the aerosol-generating article in any suitable form. The three dimensional code may be attached to the aerosol-generating article. The three dimensional code may be part of the aerosol-generating article. In some embodiments, the three dimensional code may be attached to the aerosol-generating article by adhering a sticker comprising the three dimensional code. In some embodiments, the three dimensional code may be attached to the aerosol-generating article by depositing a layer of material forming the three dimensional code onto the aerosol-generating article.

The three dimensional code may be part of the aerosol-generating article. The three dimensional code may be integrally formed with the aerosol-generating article. The three dimensional code may be engraved in a surface area of the aerosol-generating article.

A three dimensional code may offer a number of advantages. The code may be formed such that it is not visible with the naked eye. Thus, the appearance of the aerosol-generating article is not affected by the presence of the three dimensional code on its surface. Moreover, due to its invisibility a potential counterfeiter may not even be aware of the presence of the three dimensional code.

Even if a counterfeiter would be aware of the existence of the three dimensional code, copying and implementation of a three dimensional code may be more complex and difficult than of conventional two dimensional codes. Also additional machinery may be necessary that may not be available to counterfeiters.

The three dimensional code may be provided at a single area of the aerosol-generating article. In some embodiments, the three dimensional code may be provided at several areas of the aerosol-generating article. By such provision of three dimensional codes, disruption of the codes, for example, due to inadvertent damage or inaccurate manufacturing, may be compensated. In order to verify data integrity the three dimensional code checksums or similar functions may be used.

In general, the form of the three dimensional code may be adapted to the reading means that are intended to be used for reading out the three dimensional code. These reading means may include optical or mechanical reading means. The optical reading means may be similar to reading means used in CD-ROM/DVD-ROM devices. Mechanical reading means may comprise means for performing surface topology scanning, such as means for performing atomic force microscopy techniques.

The three dimensional code may be readable by optical means. The three dimensional code may be readable by mechanical means. The three dimensional code may be readable by both optical means and mechanical means. The three dimensional code may comprise pits and lands. The pits and lands may be engraved in a surface of the aerosol-generating article. The pits and lands may be engraved in a reflective surface. In some embodiments, the depth of the pits may amount to about ¼ of a wavelength of an optical reading means.

As in conventional CD formats, the pits and lands may be used to represent ones and zeros of binary data. In some embodiments, a non-return-to-zero coding may be used. In some embodiments wherein a non-return-to-zero coding is used, a change from pit to land or land to pit indicates a one, while no change indicates a zero or a series of zeros.

The dimensions of individual structures of the three dimensional code may range between 10 nanometers and 100 micrometers. Pits and lands typically used in CD technology have dimensions ranging between 100 nanometers and 5 micrometers. The depth of the pits usually amounts to 50 to 500 nanometers. Such structures can suitably be read out with readily available optical devices. In some embodiments, the three dimensional code is not visible to a naked human eye. In some embodiments, a human having average eyesight may not be able to see the three dimensional code The aerosol-generating article may have any suitable shape. The aerosol-generating article may have a flat shape. The aerosol-generating article may have a rotational symmetric shape. For example, the aerosol-generating article may have a cylindrical shape. The aerosol-generating article may be disc shaped. The aerosol-generating article may have a non-rotational symmetric cross section. For example, the aerosol-generating article may have a square cross section or a rectangular cross section. The aerosol-generating article may comprise one or more layers of aerosol-forming substrate. The one or more layers of aerosol-forming substrate may be affixed together. The aerosol-generating article may have a housing defining a cavity in which the aerosol-forming substrate is provided. The aerosol-generating article may comprise a flat substrate defining a support surface for an aerosol-forming substrate. The aerosol-generating article may comprise a heating element. The aerosol-generating article may comprise an electric heating element. In use of the article with an aerosol-generating device, the heating element of the aerosol-generating article may be provided with electrical energy to heat up the aerosol-forming substrate. For example, in some embodiments, the aerosol-generating article comprises a susceptor element. As used herein, the term 'susceptor' refers to a material that is capable of converting electromagnetic energy into heat. When located in an alternating electromagnetic field, typically eddy currents are induced and hysteresis losses may occur in the susceptor causing heating of the susceptor. As the susceptor is located in thermal contact or close thermal proximity with the aerosol-forming substrate, the substrate is heated by the susceptor such that an aerosol is formed. In some embodiments, the susceptor is arranged at least partially in direct physical contact with the aerosol-forming substrate of the aerosol-generating article.

The susceptor may be formed from any material that can be inductively heated. Preferably, the susceptor may be formed from any material that can be inductively heated to a temperature sufficient to generate an aerosol from the aerosol-forming substrate. Preferred susceptors comprise a metal or carbon. A preferred susceptor may comprise or consist of a ferromagnetic material, for example ferritic iron, a ferromagnetic alloy, such as ferromagnetic steel or stainless steel, and ferrite. A suitable susceptor may be, or may comprise, aluminium.

Preferred susceptors are metal susceptors, for example stainless steel. However, susceptor materials may also comprise or be made of graphite, molybdenum, silicon carbide, aluminium, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

A susceptor preferably comprises more than 5%, preferably more than 20%, preferably more than 50% or 90% of ferromagnetic or paramagnetic materials. Preferred susceptors may be heated to a temperature in excess of 250 degrees Celsius. Suitable susceptors may comprise a non-metallic core with a metal layer disposed on the non-metallic core, for example metallic tracks formed on a surface of a ceramic core.

The susceptor element may be provided in any number of forms, for example, a powder, strips, shreds, a solid block, a sheet, a wrapper, etc.

The aerosol-generating article may be arranged for use with an aerosol-generating device. The aerosol-generating device may comprise one or more induction coils configured to induce eddy currents and/or hysteresis losses in a susceptor material, which results in heating of the susceptor material. The aerosol-generating article comprising a susceptor element may thus be heated by an aerosol-generating device comprising one or more induction coils. A susceptor element comprising the susceptor material may comprise any suitable material, such as those described in, for example, PCT Published patent Applications WO 2014/102092 and WO 2015/177255.

In some embodiments, the aerosol-generating article does not comprise a heating element and the aerosol-generating article is instead configured to be heated by an aerosol-generating device. Even where the aerosol-generating article does not comprise a susceptor element, the aerosol-generating article may be heatable, in some embodiments, by an aerosol-generating device comprising one or more inductors (such as an induction coil) and a susceptor element provided by the device. The susceptor element provided by the device may be arranged so that when the device receives the aerosol-generating article, the susceptor element is in contact with or is proximal to the aerosol-forming substrate of the aerosol-generating article.

The three dimensional code may provide information about the aerosol-forming substrate. The three dimensional code may provide information about a type of the aerosol-forming substrate. For example, the three dimensional code may provide information about the aerosol-forming substrate being a menthol flavour aerosol-forming substrate. In some embodiments, the three dimensional code may provide information about a preferred heating profile for the aerosol-forming substrate.

The aerosol-generating article may comprise several sections. The several sections may be provided with the same kinds of aerosol-forming substrate. The several sections may be provided with different kinds of aerosol-forming substrate. The three dimensional code may provide information about the aerosol-forming substrate provided in each respective section. In use of the aerosol-generating article, the aerosol-generating device may be configured to be operated such that the different sections of the aerosol-generating article may be heated independently from each other.

The aerosol-generating article may be configured to be rotatably mountable in an aerosol-generating device. In this way the aerosol-generating article may allow the three dimensional code to be read out similarly as CD-ROMs are read out in CD players. The aerosol-generating article may be rotatable in an optical path of a beam of radiation, such that the surface area of the aerosol-generating article comprising the three dimensional code is carried through the beam of radiation and such that the reflected beam is received in the optical receiver.

In some embodiments, the surface area of the aerosol-generating article comprising the three dimensional code may be covered by a transparent, protective material. This may protect the three dimensional code from damage or detrimental external influences. The protective material may be a polymeric material. In some embodiments, the protective material comprises polyethylene. In some embodiments, the protective material comprises polypropylene. In some embodiments, the protective material comprises both polyethylene and polypropylene.

The three dimensional code may be provided in the form of a sticker attached to the aerosol-generating article. The three dimensional code may be provided in the form of a wrapper attached to the aerosol-generating article. In some embodiments, such sticker or wrapper may be formed from a layered structure. The layered structure may comprise a reflective material which is sandwiched between two layers of polymeric materials. The two layers of polymeric materials may be identical. The two layers of polymeric materials may be different. The two layers of polymeric materials may be selected from polymeric material such as polyethylene or polypropylene. The layer of reflective material may comprise metallic material. The layer of reflective material may comprise metallic foil, such as aluminum foil.

In some embodiments, the present invention relates to an aerosol-generating device. The aerosol-generating device is configured to receive an aerosol-generating article as above described. The aerosol-generating device may comprise a cavity. The cavity may be arranged for at least partially receiving the aerosol-generating article. The aerosol-generating device preferably comprises a detector capable of reading the three dimensional code of the aerosol-generating article.

As used herein, an aerosol-generating device relates to a device that interacts with an aerosol-forming substrate of an aerosol-generating article to generate an inhalable aerosol. The aerosol-generating device may be a portable device. The aerosol-generating device may be a handheld device. The aerosol-generating device may be a device which is configured to be held between the fingers of a single hand.

The aerosol-generating device may comprise electric circuitry. The electric circuitry may comprise a microprocessor, which may be a programmable microprocessor. The microprocessor may be part of a controller. The electric circuitry may comprise a memory. The memory may comprise information about one or more acceptable three dimensional codes. The one or more three dimensional codes may be codes known or pre-programmed into the memory as indicating a genuine aerosol-generating device. The memory may comprise information about one or more heating profiles. The memory may comprise information about a preferred heating profile for one or more pre-defined types of aerosol-forming substrate of an aerosol-generating article. The memory may comprise a look up table comprising operational information. The look up table may comprise a preferred heating profile for each of a respective one or more types of aerosol-forming substrate. The electric circuitry may comprise further electronic components.

The aerosol-generating device may comprise a power supply within a main body of the aerosol-generating device. The power supply may be a battery. The power supply may require recharging. The power supply may have a capacity that enables to store enough energy for one or more usage experiences.

The aerosol-generating device may further comprise a heating element for heating the aerosol-forming substrate of the aerosol-generating article. In some embodiments of the disclosure, the heating element may comprise an electrically resistive heating element. The electrically resistive heating element may comprise an electrically resistive material. The heating element may take any suitable form. For example, the heating element may take the form of a heating blade, a heating pin or a heating tube. In some embodiments, the heating element may take the form of a casing. In some embodiments, the heating element may take the form of a substrate. In some embodiments, the casing or substrate comprises different electro-conductive portions. In some embodiments, the casing or the substrate may comprise an electrically resistive metallic tube. In some embodiments, the heating element may be one or more heating needles or rods that run through the center of the aerosol-forming substrate. Other alternatives include a heating wire or filament, for example a Ni—Cr (Nickel-Chromium), platinum, tungsten or alloy wire or a heating plate. Optionally, the heating element may be deposited in or on a rigid carrier material. The electrically resistive heating element may be formed using a metal having a defined relationship between temperature and resistivity. In some embodiments, the metal may be formed as a track on a suitable insulating material, such as ceramic material, and then may be sandwiched in another insulating material, such as a glass. Heaters formed in this manner may optionally be used to both heat and monitor the temperature of the heating elements during operation. In some embodiments, the heating element may comprise a plurality of heating elements.

The heating element advantageously heats the aerosol-forming substrate, for example by means of conduction. The heating element may be arranged such that in use, the heating element is at least partially in contact with the aerosol-forming substrate, or with a carrier on which the aerosol-forming substrate is deposited. In some embodiments, heat from the heating element may be conducted to the aerosol-forming substrate by means of a heat conductive element.

The electric circuitry may be configured to regulate a supply of power to the heating element. In some embodiments, power may be supplied to the heating element continuously following activation of the aerosol-generating device. In some embodiments, power may be supplied to the heating element intermittently. For example in some embodiments, power may be supplied to the heater on a puff-by-puff basis. The power may be supplied to the heating element in the form of pulses of electrical current. The electric circuitry may be configured to monitor the electrical resistance of the heating element and preferably to control the supply of power to the heating element in dependence on the electrical resistance of the heating element.

As mentioned above, the aerosol-generating device comprises a detector for reading the three dimensional code. The detector may comprise suitable means for reading the three dimensional code.

The detector may comprise optical means for reading the three dimensional code of the aerosol-generating article. The optical means for reading the three dimensional code may comprise a radiation source. The radiation source may be configured to generate a radiation which is used for reading out the three dimensional code. The radiation source may be configured to generate a beam of radiation. The radiation source may be a laser radiation source. The radiation source may produce radiation of any suitable wavelength. The radiation source may generate radiation having a predefined wavelength. The radiation source may generate UV radiation. The radiation source may generate IR radiation. The radiation source may generate visible light. The radiation source may generate monochromatic radiation. The monochromatic radiation may be radiation having a predefined wavelength.

In some embodiments, the optical means for reading the three dimensional code may comprise at least an optical receiver for receiving radiation reflected from the three dimensional code. In some embodiments, the optical means for reading the three dimensional code may comprise at least one mirror. The at least one mirror may be configured to direct the radiation towards the three dimensional code.

In embodiments in which the detector comprises optical means for reading the three dimensional code, the three dimensional code may optionally be provided in or on a reflective material. The optical means for reading the three dimensional code may comprise an optical receiver configured to receive radiation reflected from the three dimensional code.

Optical means for reading the three dimensional code allow for contact-free and non-invasive reading of the three dimensional code. In embodiments wherein the aerosol-generating article is configured as a disposable aerosol-generating article, optical detection means may facilitate handling of the aerosol-generating device. Since the optical detection means does not require direct physical contact between the detector and the aerosol-generating article, the aerosol-generating article needs not to be mounted in direct vicinity to the detector. Accordingly there may be less risk to damage the detector upon insertion and removal of the aerosol-generating article.

The aerosol-generating device may be configured to allow for rotatably mounting the aerosol-generating article therein. In some embodiments, the cavity for receiving the aerosol-generating article may comprise means for rotatably mounting the aerosol-generating article. For example, the device may comprise a post or spindle onto which the aerosol-generating device may be mounted. The device may comprise a rotatable plate onto which the aerosol-generating device may be mounted.

In use, the aerosol-generating article may be rotated within the cavity of the aerosol-generating device. The rotation of the aerosol-generating article may be such that the three dimensional code is carried through the optical path of the optical means for reading the three dimensional code, such as through the optical path of radiation emitted by the radiation source. In this way the optical means may read the information provided by the three dimensional code in a similar way as is done in CD-ROM devices.

In some embodiments, the detector of the aerosol-generating device for reading the three dimensional code may comprise mechanical means for reading the three dimensional code. Such mechanical means may comprise means for performing surface topology scanning. The mechanical means may, for example, comprise means for performing one or more atomic force microscopy (AFM) techniques.

The means for performing one or more atomic force microscopy techniques may comprise a cantilever. The cantilever may be arranged to deflect in response to the surface topography of the surface area comprising the three dimensional code of the aerosol-generating article. Deflection of the cantilever may be detected by optical means. To this end, the detector may further comprise a radiation source for detecting the deflection of the cantilever.

The common working principle of atomic force microscopy techniques is that a needle-shaped tip is mounted on a force sensor (typically a cantilever) and is brought in close vicinity to a surface. The tip can be brought in direct contact with the surface and the surface topography can be directly measured by moving the tip at a fixed distance over the surface and detecting deflection of the tip. The surface topography is scanned line by line such as to obtain a topographic image of a specific surface area.

An AFM may also be operated in a so-called “non-contact mode” in which the force sensor is driven to oscillate at its Eigenfrequency. By bringing the tip close to the surface, the interaction between the tip and the surface changes the oscillation frequency. These changes of the oscillation frequency may be converted into a topographic profile of the scanned surface area.

In embodiments in which the force sensor is a deflectable cantilever, the deflection of the cantilever may be determined by reflection of a laser beam that is directed to the backside of the cantilever. The laser beam is reflected from the backside of the cantilever to an optical receiver. The reflected beam is detected by the optical receiver and may be used to determine the deflection amplitude or the oscillation frequency of the cantilever.

The three dimensional code may be provided directly on a surface area of the aerosol-generating article. Advantageously, this particularly facilitates reading of the three dimensional code via atomic force microscopy techniques. In particular, the three dimensional code should not be covered by a protective layer since this may prevent detection of the code by the mechanical means. Without a protective coating the three dimensional code may be more susceptible to physical damage during handling of the aerosol-generating article. In some embodiments, the three dimensional code is provided not only on a single surface area but to plurality of surface areas of the aerosol-generating article. Thus, if the three dimensional code at one surface area is damaged or disrupted, the required information may still be read from an identical code provided on another surface area of the aerosol-generating article.

An advantage of using surface topology scanning techniques is that the aerosol-generating article may have any desired shape as long as there is provided at least one relatively flat surface area having the three dimensional code. A further advantage is that the aerosol-generating article is not necessarily required to be mounted rotatably in the aerosol-generating device.

The dimensions of the three dimensional code may be chosen such that they allow to be reliably read by the respective detector. If the detector comprises optical means for reading the three dimensional code, the dimensions of the individual pits and lands forming the code elements may depend on the wavelength of the radiation used for reading out the code. For example the depth of the pits may be amount to about ¼ of the wavelength of the radiation source. The depth of the pits may range from about 50 nanometers to about 1 micrometer. The width of the pits and lands may range from about 100 nanometers up to about 5 micrometers.

Atomic force microscopy techniques are usually used for surface imaging in the nanometer or even in the subnanometer scales. Thus, atomic force microscopy techniques are readily suitable to read out three dimensional surface structures like the pits and lands having the above mentioned dimensions.

In some embodiments, the detector comprises both optical means for reading the three dimensional code and mechanical means for reading the three dimensional code. In some embodiments, the detector only comprises one of an optical means for reading the three dimensional code or a mechanical means for reading the three dimensional code Each of the above discussed optical or mechanical means for reading out the three dimensional code may comprise a radiation source. In particular, if this radiation source is a laser source, in some embodiments, the radiation may also be used for heating the aerosol-forming substrate of the aerosol-generating article. In this regard, in some embodiments, a beam splitter may be provided (for example as part of the aerosol-generating device). The beam splitter may be configured to separate the beam of radiation source into a beam that is used for reading the three dimensional code and a beam that is used for heating the aerosol-forming substrate of the aerosol-generating article. In some embodiments, additional mirrors may be provided by which the beam may be directed towards the aerosol-forming substrate. Additional mirrors may be used in combination with or alternative to a beam splitter. In some of such embodiments, in use, reading out the three dimensional code may be performed after insertion of a new aerosol-generating article and/or upon switching on the aerosol-generating device. Whenever the radiation is not required for reading out the three dimensional code, the radiation may, in some embodiments, be used for heating the aerosol-forming substrate. To this end the one or more mirrors used for guiding the radiation may be configured moveable. Advantageously, the radiation can be directed to any desired surface area of the aerosol-forming substrate to heat the aerosol-forming substrate.

In embodiments in which the aerosol-generating article is rotatably mountable in the aerosol-generating device, the rotation speed of the rotatable mount may be adjustable. The rotation speed for reading out the three dimensional code may be higher than the rotation speed used during heating the aerosol-forming substrate. The aerosol-generating device may be configured to adjust the rotation speed. This may allow to select appropriate conditions depending on the task to be performed by the aerosol-generating device.

In an embodiment of the present invention there is provided an aerosol-generating system comprising an aerosol-generating device and an aerosol-generating article as described above.

In another embodiment of the present invention there is provided a method for generating an aerosol in an aerosol-generating system. The method comprises: providing an aerosol-generating article having a three dimensional code, reading the three dimensional code by a detector, and operating an aerosol-generating device based on information comprised in the three dimensional code.

In some embodiments, the aerosol-generating device comprises the detector.

In some embodiments, the method comprises determining whether the read three dimensional code matches an expected three dimensional code.

In some embodiments, the method comprises decoding the three dimensional code. The method may comprises determining whether the decoded read three dimensional code matches an expected decoded three dimensional code.

In some embodiments, the method comprises, in dependence on determining that the three dimensional code does match the expected three dimensional code (or that the decoded three dimensional code does match decoded the expected three dimensional code), enabling activation of a heating element of the aerosol-generating device. In some embodiments, enabling activation of a heating element may comprise allowing a power supply to supply power to the heating element.

In some embodiments, the method comprises, in dependence on determining that the three dimensional code does not match the expected three dimensional code (or that the decoded three dimensional code does not match decoded the expected three dimensional code), prohibiting activation of a heating element of the aerosol-generating device. In some embodiments, prohibiting activation of a heating element may comprise prohibiting a power supply to supply power to the heating element.

In some embodiments, the information provided in the three dimensional code may be read upon activation of the aerosol-generating device. In some embodiments, activation of the aerosol-generating device may comprise switching on the aerosol-generating device. In some embodiments, initial activation or switching on of the aerosol-generating device does not comprise activating the heating element. In some embodiments, the heating element may be initially disabled, even upon initial activation or switching on of the aerosol-generating device. In some embodiments, the heating element may only be activated after the information provided in the three dimensional code of the aerosol-generating article has been read and determined as matching an expected piece of information. In some embodiments, the information provided in the three dimensional code may be used for one or a plurality of purposes.

The three dimensional code may provide information regarding the aerosol-generating article. The three dimensional code may provide information regarding one or more specificities of the aerosol-generating article. The three dimensional code may provide information regarding one or more specific properties of the aerosol-generating article. The three dimensional code may provide information regarding one or more preferred device operation parameters for the aerosol-generating article. The three dimensional code may comprise information regarding any one or more or combination of: content of the aerosol-generating article, content of an aerosol-forming substrate of the aerosol-generating article, preferred operating temperature range, date of expiration of the aerosol-generating article and/or any further information regarding the aerosol-generating article.

The aerosol-generating device may use such information provided by the three dimensional code to adjust one or more parameters of the aerosol-generating device. The aerosol-generating device may use such information provided by the three dimensional code to adjust one or more parameters of the aerosol-generating device corresponding to these parameters. Adjusting one or more parameters of the aerosol-generating device may thereby ensure that appropriate operating conditions for the provided aerosol-generating article are employed.

In some embodiments, information provided by the three dimensional code may be displayed or notified to the user by any suitable means. For example, in some embodiments, a visual display may be provided at the outer surface of the aerosol-generating device. In some embodiments, the aerosol-generating device comprises one or more lights, such as LEDs for communicating information to a user. In some embodiments, information may be conveyed to the user by audio means, such as via a speaker. In some embodiments, information may be conveyed to the user by one or more haptic signals.

In some embodiments, the information may be used to check authenticity of the aerosol-generating article. To this end the three dimensional code may comprise specific information, which allows to determine whether the product is a genuine product originating from an authentic source.

In embodiments where the aerosol-generating article comprises a plurality of different sections, the three dimensional code may provide a mapping of these sections. This may be particularly beneficial where one or more of each of the sections has one or more different properties from one or more of the other sections. Examples of different properties include, but are not necessarily limited to: different aerosol-forming substrate, different tobacco blend, different aerosol-former concentrations, different densities, different types of sensorial media (e.g. solid, vs. liquid, vs. gel), or any combination thereof. In embodiments where the aerosol-generating article comprises a plurality of different sections, the three dimensional code may provide information about the content of each section. In some embodiments, the three dimensional code providing information about the content of each section may be used to apply one or more different temperature over time heating profiles for a given section. In this way, in some embodiments, the user may select which sections of the aerosol-forming substrate are to be heated. In some embodiments, the aerosol-generating device may thus operate under one or more pre-defined operation conditions that are appropriate for each of selected section. In some embodiments, the controller may automatically select specific sequences of sections of the aerosol-generating article to be heated corresponding to the information provided in the three dimensional code. For instance, in some embodiments, the controller may heat sections with increasing or decreasing concentration of a component. Advantageously, the inhalation experience may follow a specific or pre-defined sequence for achieving a desired delivery experience. For example, the inhalation experience may follow a specific or predefined sequence for achieving a medical progress. In some embodiments, the controller may provide feedback about the consumption of aerosol-forming substrate of an inhalation experience.

Features described in relation to one embodiment may equally be applied to other embodiments of the invention.

The invention will be further described, by way of example only, with reference to the accompanying drawings in which.

Figure 5:
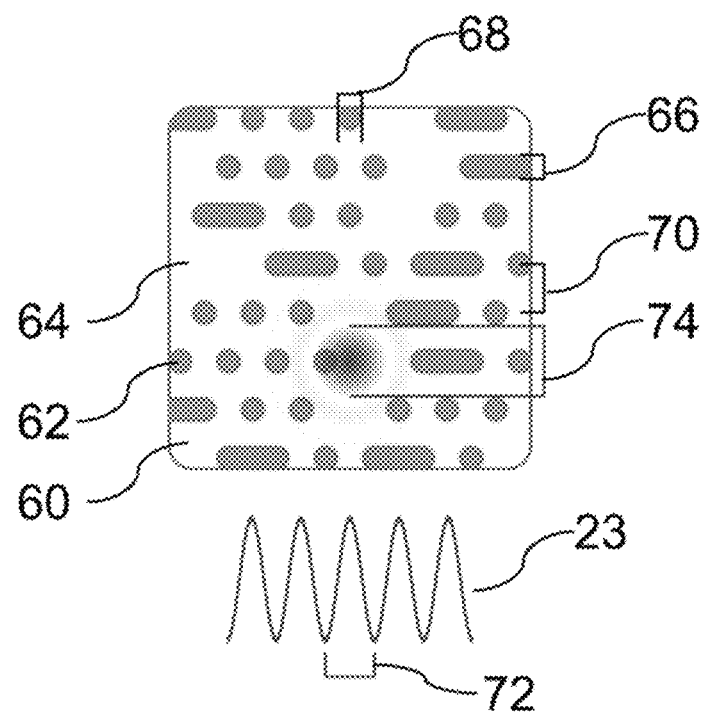
Figure 6:
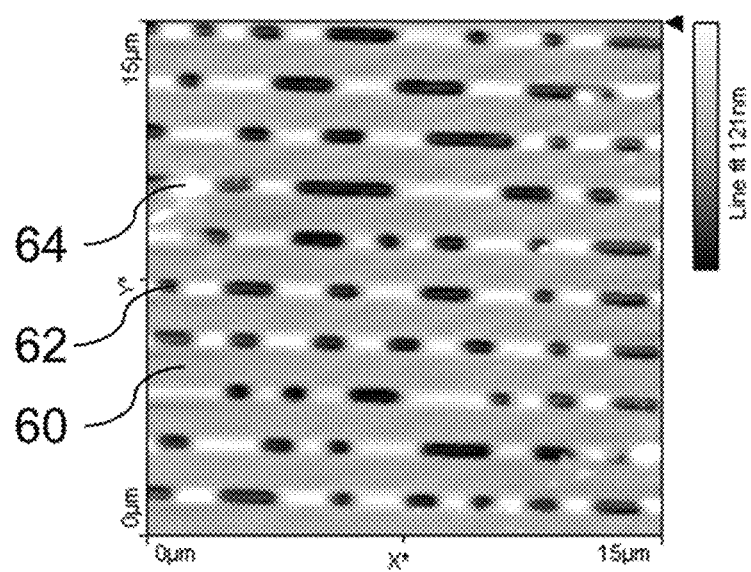

FIG. 5 schematically shows a section of a conventional CD-ROM,

FIG. 6 shows an AFM image of a conventional CD-ROM, and

Figure 7:
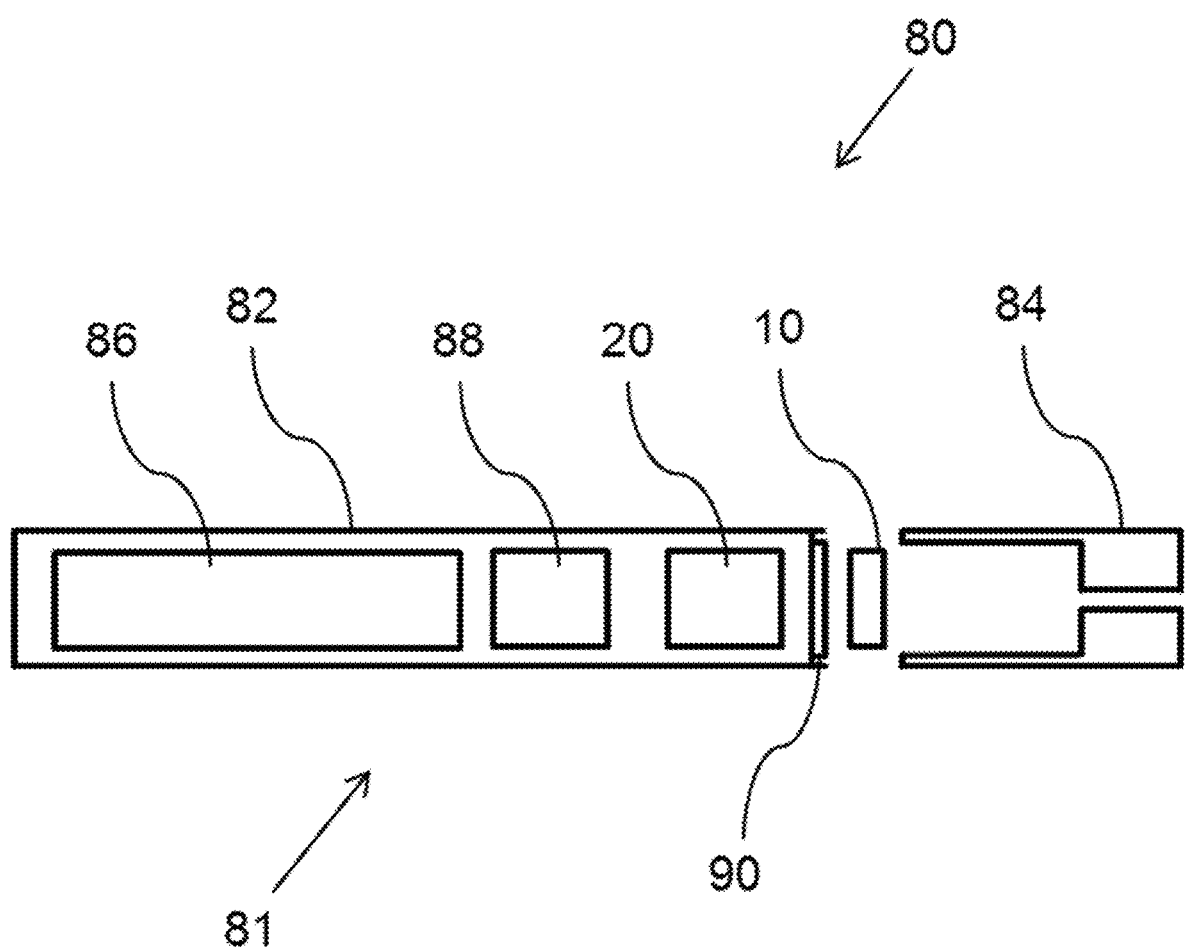

FIG. 7 shows an aerosol-generating system.

Figure 1:
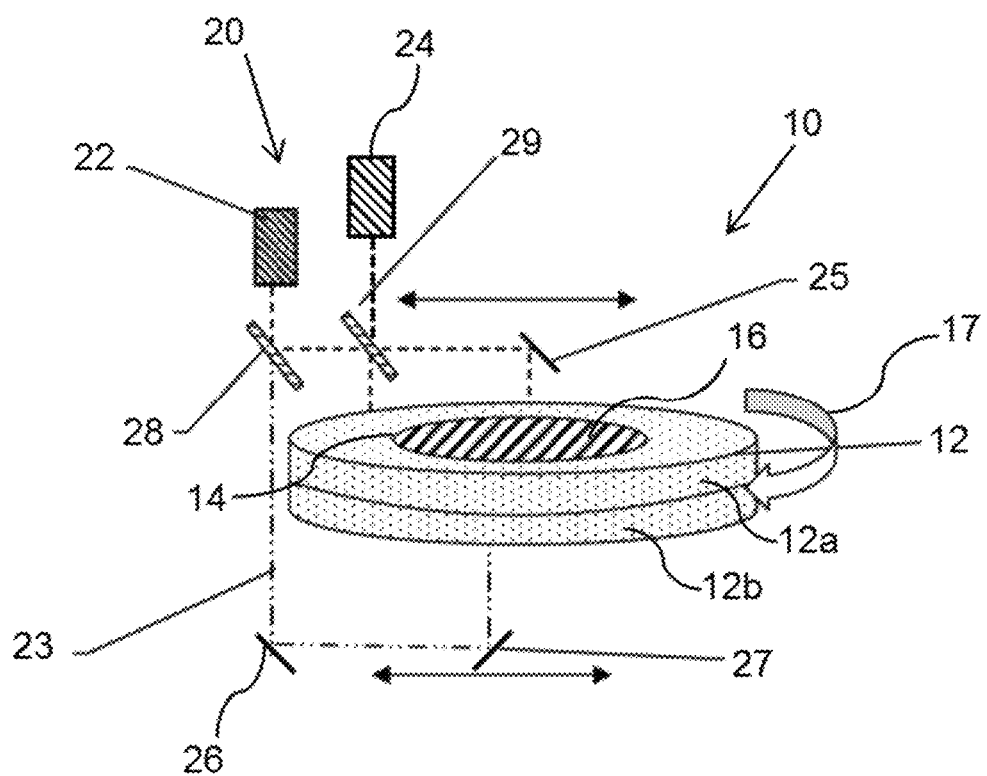
FIG. 1 shows an aerosol-generating article and a detection means.

FIG. 1 shows an aerosol-generating article according to the present invention. The aerosol-generating article 10 is a replaceable article for use with and for insertion into an aerosol-generating device. The aerosol-generating article 10 depicted in FIG. 1 is disc-shaped and comprises two layers 12a, 12b of aerosol-forming substrate 12 that are affixed together. A sticker 14 comprising a three dimensional code 16 is attached to the upper layer 12a of aerosol-generating substrate 12.

The sticker 14 comprises a reflective aluminium foil onto which the three dimensional code 16 is engraved. The three dimensional code 16 comprises pits and lands and may have a similar construction as the pits and lands used in CD-ROM or DVD technology. In order to protect the three dimensional code 16 from detrimental external influence, the code structure is protected by a transparent layer made from polyethylene (not shown).

In use, the aerosol-generating article 10 is rotatably mounted in an aerosol-generating device. The aerosol-generating device comprises a detector 20 configured for reading out the three dimensional code 16 on the aerosol-generating article 10. In the embodiment in FIG. 1 the detector 20 is an optical system comprising a laser diode 22, a receiver 24 and a number of mirrors 25, 26, 27 and beam splitters 28, 29.

The laser diode 22 is configured to generate a light beam 23 having a wavelength of 405 nanometers. This light beam 23 is directed by the two beam splitters 28, 29 and mirror 25 onto the sticker 14 having the three dimensional code 16. The beam is reflected from the surface of the sticker 14. The reflected beam is received by an optical receiver 24 and evaluated by the controller of the aerosol-generating device. For reading the three dimensional code 16, the aerosol-generating article 10 is rotated in the aerosol-generating device. The rotation of the aerosol-generating article 10 is indicated by the arrow 17 in FIG. 1, and is configured such that the three dimensional code 16 is carried through the laser beam 23. The reflected laser beam is received by the receiver 24 and decoded by a controller.

The controller is configured to confirm authenticity of the aerosol-generating article 10 based on the information provided in the three dimensional code 16. The controller compares the decoded three dimensional code to one or more expected pieces of information or to an expected decoded three dimensional code to determine authenticity of the aerosol-generating article 10. The three dimensional code 16 may comprise further information on the type of aerosol-forming substrate 12 provided in the aerosol-generating article 10. Based on this information the controller may adjust one or more operating parameters of the aerosol-generating device.

Figure 2:
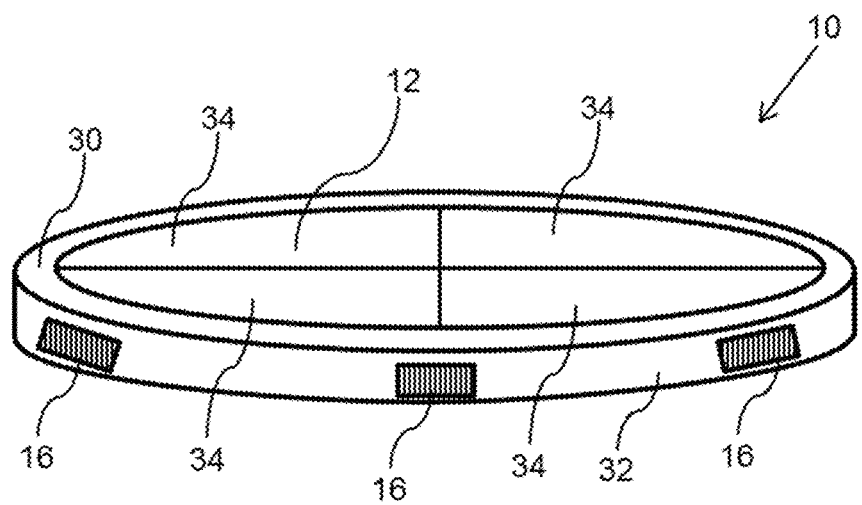
FIG. 2 shows embodiments of an aerosol-generating article with square (FIG. 2a) and cylindrical (FIG. 2b) shape.
Figure 2:
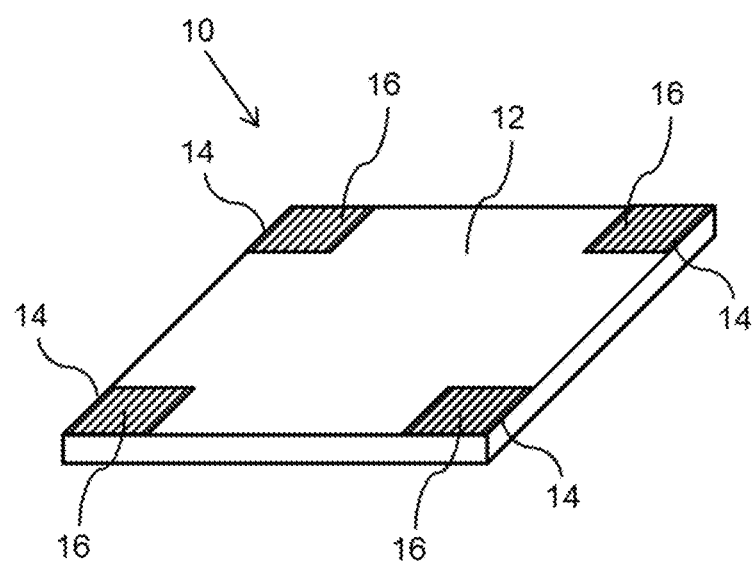
Figure 3:
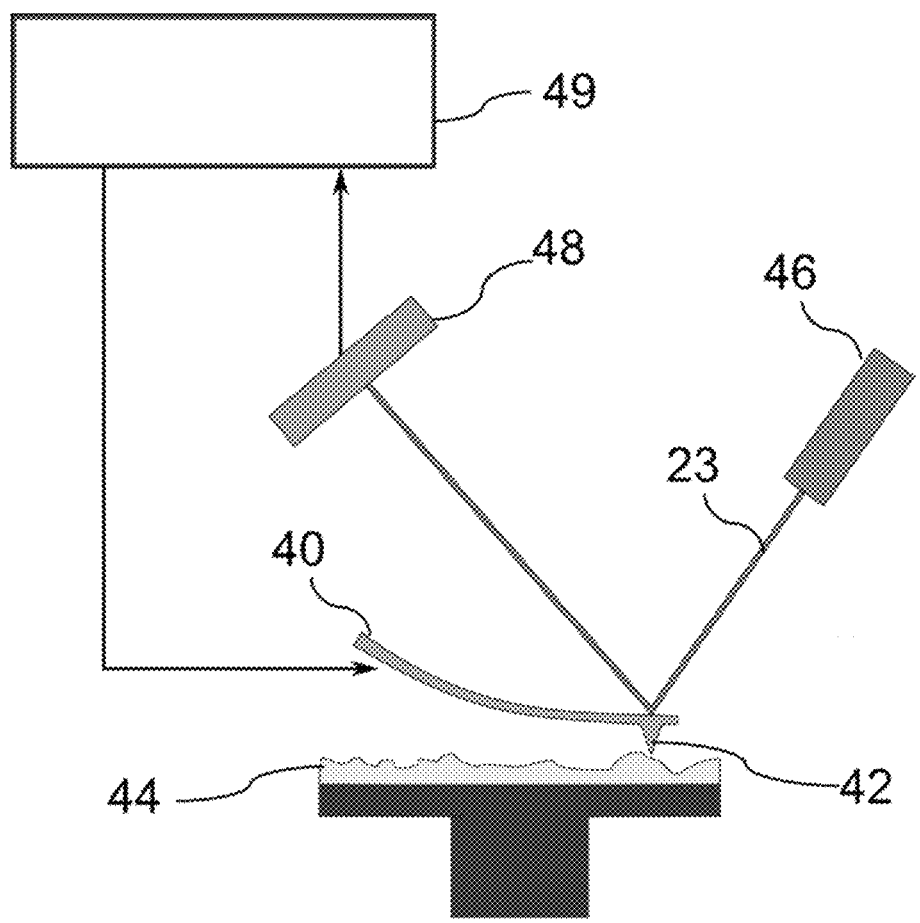
FIG. 3 shows a schematic of a functional layout of a contact mode AFM.
Figure 4:
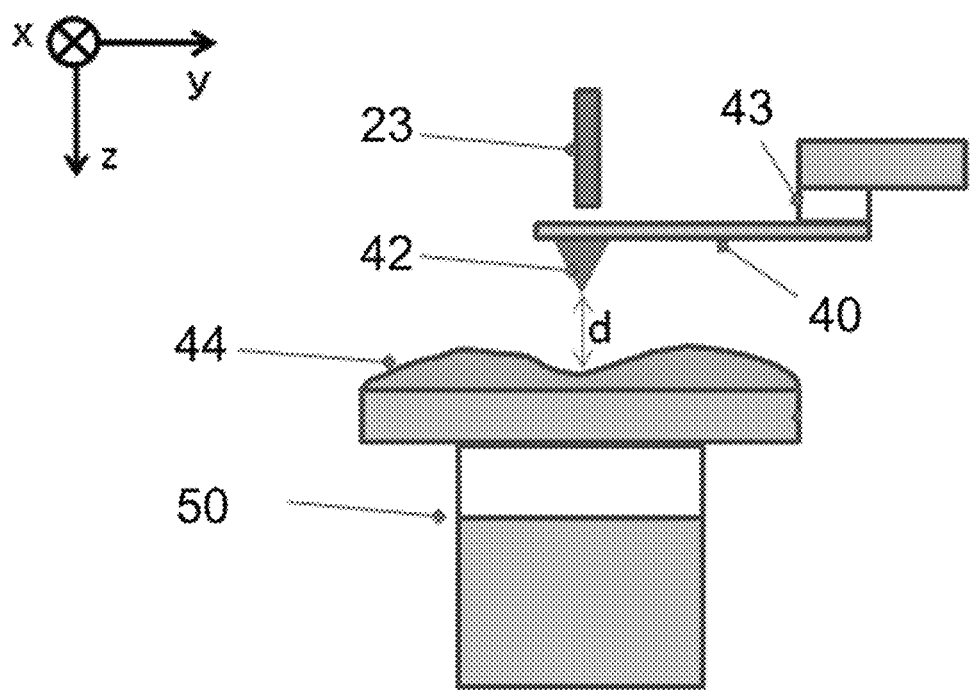
FIG. 4 shows a schematic of a functional layout of a non-contact mode AFM.

In FIGS. 2a and 2b two further embodiments of an aerosol-generating article 10 are depicted. In FIG. 2a the aerosol-generating article 10 is also disc-shaped and has a ring shaped outer wall 30 made from aluminium forming the housing of the aerosol-generating article 10. The aerosol-forming substrate 12 is provided in the central area within the ring shaped outer wall 30. The three dimensional code 16 is directly engraved to the outer sidewall 32 of the housing. The three dimensional code 16 is provided at plural locations, such that the code 16 can still be read if one of the areas comprising the code 16 is damaged, for example, during transport or handling of the aerosol-generating article 10.

The aerosol-forming substrate 12 is provided in four different sections 34 within the aerosol-generating article 10. These sections 34 may each comprise different kinds of aerosol-forming substrate 12. The aerosol-generating device may be configured to heat each of these sections 34 independently from each other. The three dimensional code 16 provides information about the aerosol-forming substrate 12 provided in each section 34 such that the controller can operate the aerosol-generating device according to a desired predefined profile.

The aerosol-generating article 10 depicted in FIG. 2b is not rotational-symmetric, but is square shaped. The aerosol-forming substrate 12 is again provided in the central area of the aerosol-generating article 10. The three dimensional code 16 is provided on stickers 14 that are attached to each corner of the aerosol-generating article 10.

The three dimensional code 16 of non-rotational-symmetric aerosol-generating articles 10 may advantageously be read out by a detector that does not require relatively fast rotation of the aerosol-generating article 10. In such embodiments the three dimensional code 16 of the aerosol-generating article 10 of FIG. 2*b* may be read out using one or more surface scanning techniques, such as atomic force microscopy (AFM).

FIGS. 3 and 4 illustrate the two main working principles of an AFM. In FIG. 3 the so-called contact modus is schematically depicted, in which a bendable cantilever 40 carrying a fine tip 42 is guided across a sample surface 44. The tip 42 of the cantilever 40 follows the surface topography which leads to changes in the bend angle of the cantilever 40. The bend angle of the cantilever 40 is monitored by an optical device including a laser diode 46 and a segmented photodiode 48. The laser diode 46 generates a laser beam 23 that is directed to the backside of the cantilever 40 and is reflected onto the segmented photo diode 48. Slight changes of the bending angle of the cantilever 40 lead to movement of the laser spot across a sensitive area of the photodiode 48, which can be converted by control electronics 49 into a height profile of the scanned sample surface 44.

Another working principle of an AFM, the so-called non-contact modus is depicted in FIG. 4. Again a bendable cantilever 40 carrying a fine tip 42 is provided. This cantilever 40 is however not brought into direct contact with the surface 44, but is excited by piezo element 43 to oscillate at its eigenfrequency at a certain distance d above the surface 44. When the tip 42 comes close to the surface 44, attractive forces between the surface 44 and the tip 42 slightly influence the oscillation frequency of the cantilever 40. The oscillation of the cantilever 40 is again detected by a laser beam 23 that is reflected from the backside of the cantilever 40 onto a segmented photo diode (not shown in FIG. 4).

The change of the oscillation frequency is a direct measure for the attractive forces between tip 42 and surface 44. Since these forces strongly depend on the distance between tip 42 and sample surface 44, the change of the oscillation frequency is also directly related to the distance between the tip 42 and the sample surface 44. The distance of the tip 42 to the surface 44 can be adjusted by piezoelectric positioning elements 50. In order to generate a topographic image of the surface 44 in non-contact AFM mode, the cantilever 40 is scanned over the surface 44, and the oscillation frequency is kept constant by adjusting the distance between tip 42 and surface 44 according to the surface topography. Thus, by recording the vertical adjustment movement of the cantilever 40 during scanning of a surface area 44 a topographic image of the surface 44 is obtained.

In order to read the three dimensional code 16 of the aerosol-generating article 10 of FIG. 2*b*, when the aerosol-generating article 10 is received by the aerosol-generating device, a compact AFM device provided in the aerosol-generating device may be arranged on or close to one of the stickers 14 provided on either of the four corners of the aerosol-generating article 10. The AFM may automatically read out the three dimensional code 16 of one of the stickers 14. Again the control unit is configured to evaluate the AFM image and to decode the information provided in the three dimensional code 16.

In FIG. 5 a code as used in CD ROMs is depicted. The code consists of pits 62 and lands 64 provided in a reflective surface 60. Each single pit 62 has a width 66 and a length 68 and a depth. In some embodiments, each pit has identical dimensions, and it is simply the distribution of the pits over a surface area which provide the three dimensional code. In some embodiments, one or more pits has a different one or more dimension but an ordered distribution of the pits. In some embodiments, all of the distribution or the pits and one or more of the dimensions of the pits may differ to provide the three dimensional code. In the illustrated embodiment shown in FIG. 5, each pit 62 has a width 66 of about 600 nanometers and a length 68 of about 800 nanometers and is about 200 nanometers deep. The pitch 70 between rows amounts to 1.6 micrometers. For the three dimensional code 16 of the present invention a single row of pits 62 and lands 64 might be sufficient, in some embodiments, to comprise the desired information. In the embodiment shown in FIG. 5, a laser diode generating a laser beam 23 with a wavelength 72 of about 780 nanometers may be used. The spot size 74 of the laser beam on the surface is typically slightly larger than the width of the pits and may amount to about 1.5 micrometers. The depth of the pits 62 amounts to about ¼ of the wavelength of the laser beam 23.

FIG. 6 shows a topographic image of a CD-ROM as taken by a contact-mode atomic force microscope. The pits 62 and lands 64 are aligned along rows having a pitch 60 of about 1.6 micrometers. The pits 62 appear as dark depressions between the bright lands 64.

CD devices typically use the so-called eight-to-fourteen-modulation (EFM) for a binary code in which a change from pit 62 to land 64 and vice-versa corresponds to a “1” bit, and in which no change corresponds to a “0” bit. A similar encoding may be used for embodiments in which the aerosol-generating article 10 of the invention is rotatably mounted and in which the code is optically detected during rotation of the aerosol-generating article 10. For embodiments in which surface scanning techniques are used to detect the three dimensional code 16 a different encoding may be applied. For example the pits 62 may correspond to a binary “0” and the lands 64 may correspond to a binary “1”.

In the embodiment of FIG. 1 beam splitters 28, 29 and mirror 25 are used to direct a part of the laser beam 23 towards the sticker 14 of the aerosol-generating article 10 and in order to read out the information provided in the three dimensional code 16. The other portion of the laser beam 23 is directed directly towards the aerosol-forming substrate 12 and is used to heat, or at least to assist in heating, the aerosol-forming substrate 12. To this end, additional mirrors 26, 27 are provided. The beam splitters 28, 29 and mirrors 25, 26, 27 may be movably mounted within the aerosol-generating device (indicated to the bidirectional arrows in FIG. 1), and may be adjusted to direct the laser beam 23 to specific desired sections of the aerosol-forming substrate 12. This may particularly be useful with aerosol-generating articles 10 as depicted in FIG. 2*a* comprising a plurality of different sections 34 comprising different kinds of aerosol-forming substrates 12. Depending on the information provided in the three dimensional code 16, the controller may adjust the optical system such that the laser light is directed towards the desired aerosol-forming substrate 12.

FIG. 7 shows an exploded view of an aerosol-generating system 80 comprising an aerosol-generating device 81 and an aerosol-generating article 10. The aerosol-generating device 81 comprises a main housing part 82 and a mouthpiece part 84. The main housing part 82 comprises a power source 86, a controller 88, a detector 20 and a rotatable mounting plate 90. The mouthpiece part 84 is configured to be detachable form the main housing part 82. For insertion of an aerosol-generating article 10, the mouthpiece part 84, is temporarily removed such that the aerosol-generating article 10 can be inserted onto to the rotatable plate 90. After insertion of the aerosol-generating article 10 the mouthpiece part 84 is re-attached to the main housing part 82, and the aerosol-generating system 80 is ready for use.

The aerosol-generating article is mounted to the mounting plate 90. The detector 20 is an optical system as depicted in FIG. 1 comprising a laser diode, a receiver and a number of mirrors and beam splitters (not show in detail in FIG. 7). The light beam generated by the laser diode is directed to the rotatably mounted aerosol-generating article 10 for reading the three dimensional code.

The invention claimed is:

1. An aerosol-generating article for use with an aerosol-generating device, the aerosol-generating article comprising:
   an aerosol-forming substrate, and
   a surface area comprising a three dimensional code,
   wherein the three dimensional code comprises pits and lands, and wherein the aerosol-generating article has a flat shape, and the three dimensional code is provided on or in a reflective surface.

2. An aerosol-generating article according to claim 1, wherein the three dimensional code is provided in a form of a sticker or a wrapper attached to the aerosol-generating article.

3. An aerosol-generating article according to claim 1, wherein the three dimensional code is readable by optical or mechanical means.

4. An aerosol-generating article according to claim 1, wherein the three dimensional code is covered by transparent, protective material.

5. An aerosol-generating article according to claim 1, wherein the three dimensional code is provided at a single area of the aerosol-generating article.

6. An aerosol-generating article according to claim 1, wherein the three dimensional code is provided in a form of a wrapper attached to the aerosol-generating article, wherein the wrapper is formed from a layered structure.

7. An aerosol-generating device comprising:
   a cavity for at least partially receiving the aerosol-generating article according to claim 1;
   a detector capable of reading the three dimensional code of the aerosol-generating article.

8. An aerosol-generating device according to claim 7, wherein the detector for reading the three dimensional code comprises optical means for reading the three dimensional code.

9. An aerosol-generating device according to claim 8, wherein the optical means for reading the three dimensional code comprises a radiation source.

10. An aerosol-generating device according to claim 9, wherein the optical means for reading the three dimensional code further comprises at least one mirror and an optical receiver, and wherein the at least one mirror is configured to direct the radiation onto the three dimensional code, and wherein the optical receiver is configured to receive radiation reflected from the three dimensional code.

11. An aerosol-generating device according to claim 9, wherein the radiation source is also configured for heating the aerosol-forming substrate of the aerosol-generating article.

12. An aerosol-generating system comprising:
   an aerosol-generating device according to claim 7; and
   an aerosol-generating article comprising:
      an aerosol-forming substrate, and
      a surface area comprising a three dimensional code,
   wherein the three dimensional code comprises pits and lands, and wherein the aerosol-generating article has a flat shape, and the three dimensional code is provided on or in a reflective surface.

* * * * *